(12) United States Patent
Rune et al.

(10) Patent No.: US 9,877,352 B2
(45) Date of Patent: Jan. 23, 2018

(54) APPLICATION OF A DISCONTINUOUS RECEPTION (DRX) CYCLE

(71) Applicant: TELEFONAKTIEBOLAGET L M ERICSSON (PUBL), Stockholm (SE)

(72) Inventors: Johan Rune, Lidingö (SE); Anna Larmo, Espoo (FI); Riikka Susitaival, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/784,365

(22) PCT Filed: Apr. 3, 2014

(86) PCT No.: PCT/SE2014/050397
§ 371 (c)(1),
(2) Date: Oct. 14, 2015

(87) PCT Pub. No.: WO2014/171882
PCT Pub. Date: Oct. 23, 2014

(65) Prior Publication Data
US 2016/0073447 A1    Mar. 10, 2016

Related U.S. Application Data

(60) Provisional application No. 61/811,961, filed on Apr. 15, 2013.

(51) Int. Cl.
*H04W 76/04* (2009.01)
*H04W 52/02* (2009.01)

(52) U.S. Cl.
CPC ..... *H04W 76/048* (2013.01); *H04W 52/0235* (2013.01); *H04W 76/046* (2013.01); *Y02B 60/50* (2013.01)

(58) Field of Classification Search
None
See application file for complete search history.

(56) References Cited

U.S. PATENT DOCUMENTS

2007/0291729 A1* 12/2007 Dalsgaard ......... H04W 52/0216
370/347
2009/0034452 A1* 2/2009 Somasundaram ... H04J 11/0069
370/328

(Continued)

FOREIGN PATENT DOCUMENTS

EP    2003861 A2    12/2008
EP    2475214 A1    7/2012

(Continued)

OTHER PUBLICATIONS

3GPP TS 25.304 V11.2.0 3rd Generation Partnership Project; Technical Specification Group Radio Access Network; User Equipment (UE) procedures in idle mode and procedures for cell reselection in connected mode (Release 11), Mar. 2013.

(Continued)

*Primary Examiner* — Eunsook Choi

(57) ABSTRACT

The present disclosure concerns radio communication. More particularly, the present disclosure inter alia introduces the possibility for a user equipment (UE) to apply a temporary DRX cycle during the time period when the UE transitions from an IDLE mode to a CONNECTED mode. Thus, the disclosure presents an example method performed by a UE. The UE is configured to be either in an IDLE mode or in a CONNECTED mode. The method implemented in the UE comprises applying the temporary DRX cycle during the time period when the UE is in transition from the IDLE mode to the CONNECTED mode.

35 Claims, 8 Drawing Sheets

(56) References Cited

U.S. PATENT DOCUMENTS

| | | | | |
|---|---|---|---|---|
| 2011/0199984 A1* | 8/2011 | Umesh | H04L 1/1829 | 370/329 |
| 2012/0014361 A1* | 1/2012 | Jung | H04W 76/048 | 370/338 |
| 2012/0120843 A1* | 5/2012 | Anderson | H04W 76/048 | 370/253 |
| 2012/0170485 A1* | 7/2012 | Maeda | H04B 7/2643 | 370/252 |
| 2012/0207070 A1* | 8/2012 | Xu | H04W 48/20 | 370/311 |
| 2012/0264416 A1* | 10/2012 | Pica | H04W 76/046 | 455/422.1 |
| 2012/0287877 A1* | 11/2012 | Han | H04W 74/002 | 370/329 |
| 2012/0329462 A1* | 12/2012 | Pica | H04W 48/20 | 455/437 |
| 2013/0003577 A1* | 1/2013 | Gupta | H04W 52/0225 | 370/252 |
| 2013/0029651 A1* | 1/2013 | Martin | H04W 52/0229 | 455/418 |
| 2013/0194991 A1* | 8/2013 | Vannithamby | H04W 72/0493 | 370/311 |
| 2014/0362754 A1* | 12/2014 | Moses | H04W 60/00 | 370/311 |
| 2015/0079991 A1* | 3/2015 | Koskinen | H04W 36/0083 | 455/436 |
| 2015/0215989 A1* | 7/2015 | Bangolae | H04W 52/0251 | 370/311 |
| 2016/0007224 A1* | 1/2016 | Skog | H04W 76/048 | 370/311 |

FOREIGN PATENT DOCUMENTS

| | | |
|---|---|---|
| EP | 2547166 A1 | 1/2013 |
| JP | 2012507971 A | 3/2012 |
| RU | 2419979 C2 | 5/2011 |
| WO | 2009097506 A1 | 8/2009 |
| WO | 2012141630 A1 | 10/2012 |
| WO | 2013025147 A1 | 2/2013 |

OTHER PUBLICATIONS

Bontu, et al., DRX Mechanism for Power Saving in LTE, IEEE Communications Magazine, vol. 47, Issue 6, Jun. 2009, pp. 48-55.

3GPP TS 23.401 V11.3.0, 3rd Generation Partnership Project; Technical Specification Group Services and System Aspects; General Packet Radio Service (GPRS) enhancements for Evolved Universal Terrestrial Radio Access Network (E-UTRAN) access (Release 11), Sep. 2012.

3GPP TS 36.300 V11.3.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Sep. 2012.

3GPP TS 36.331 V11.1.0, 3rd Generation Partnership Project; Technical Specification Group Radio Access Network; Evolved Universal Terrestrial Radio Access (E-UTRA); Radio Resource Control (RRC); Protocol specification (Release 11), Sep. 2012.

3GPP TS 36.321 V11.0.0, 3rd Generation Partnership Project; Technical Specification Group Radio Access Network; Evolved Universal Terrestrial Radio Access (E-UTRA); Medium Access Control (MAC) protocol specification (Release 11), Sep. 2012.

3GPP TS 24.301 V11.4.0, 3rd Generation Partnership Project; Technical Specification Group Core Network and Terminals; Non-Access-Stratum (NAS) protocol for Evolved Packet System (EPS); Stage 3 (Release 11), Sep. 2012.

3GPP TS 36.413 V11.1.0, 3rd Generation Partnership Project; Technical Specification Group Radio Access Network; Evolved Universal Terrestrial Radio Access Network (E-UTRAN); S1 Application Protocol (S1AP) (Release 11), Sep. 2012.

RENESAS Mobile Europe Ltd., RAN Efficiency Improvement Schemes, 3GPP TSG-RAN WG2 Meeting #75bis, R2-115317, Oct. 10-14, 2011.

* cited by examiner

Table of contents

1. RA Msg1 Preamble
2. RA Msg2 Response
3. RA Msg3 RRCConnectionRequest
4. RA Msg4 RRCConnectionSetup
5. RRCConnectionSetupComplete (NAS Service Request)
6. S1AP Initial UE Message (NAS Service Request)
7. Diameter Authentication-Info-Req
8. Diameter Authentication-Info-Answer
9. S1AP Downlink NAS Transport (NAS Authentication Request)
10. DLInformationTransfer (NAS Authetication Request)
11. ULInformationTransfer (NAS Authetication Response)
12. S1AP Uplink NAS Transport (NAS Authetication Response)
13. S1AP Downlink NAS Transport (NAS Security Mode Command)
14. DLInformationTransfer (NAS Security Mode Command)
15. ULInformationTransfer (NAS Security Mode Complete)
16. S1AP Uplink NAS Transport (NAS Security Mode Complete)
17. S1AP Initial Context Setup Request
18. SecurityModeCommand
19. SecurityModeComplete
20. RRCConnectionReconfiguration
21. RRCConnectionReconf.Complete
22. S1AP Initial Context Setup Complete
23. GTPv2-C Modify Bearer Request
24. GTPv2-C Modify Bearer Request
25. Diameter CC-Request
*. PCEF Initiated IP-CAN Session Modification
26. Diameter CC-Answer
27. GTPv2-C Modify Bearer Response
28. GTPv2-C Modify Bearer Response
29. UL data
30. UL data
31. UL data
32. DL data
33. DL data
34. DL data

Figure 1B (cont.)

APPLICATION OF A DISCONTINUOUS RECEPTION (DRX) CYCLE

This application is a 371 of International Application No. PCT/SE2014/050397, filed Apr. 3, 2014, which claims the benefit of U.S. Provisional Application No. 61/811,961, filed Apr. 15, 2013, the disclosure of which is fully incorporated herein by reference.

TECHNICAL FIELD

Embodiments of the present technology presented herein generally relate to radio communication. More particularly, the embodiments presented herein generally relate to the application, or utilization, of a discontinuous reception (DRX) cycle.

BACKGROUND

This section is intended to provide a background to the various embodiments of the technology that are described in this disclosure. The description herein may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Radio communication networks are widely deployed to provide various communication services such as telephony, video, data, messaging, broadcasts, and so on. Such communication networks support communications for multiple user equipments (UEs) by sharing the available network resources. One example of such a network is the Universal Mobile Telecommunications System (UMTS), a third generation (3G) mobile phone technology standardized by the 3rd Generation Partnership Project (3GPP). UMTS includes a definition for a Radio Access Network (RAN), referred to as UMTS Terrestrial Radio Access Network (UTRAN). The UMTS, which is the successor to Global System for Mobile Communications (GSM) technologies, supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. As the demand for mobile broadband access continues to increase, research and development continue to advance the UMTS technologies not only to meet the growing demand for mobile broadband access, but to advance and enhance the user experience with mobile communications. For example, third-generation UMTS based on W-CDMA has been deployed in many places the world. To ensure that this system remains competitive in the future, 3GPP began a project to define the long-term evolution of UMTS cellular technology. The specifications related to this effort are formally known as Evolved UMTS Terrestrial Radio Access (E-UTRA) and Evolved UMTS Terrestrial Radio Access Network (E-UTRAN), but are more commonly referred to by the name Long Term Evolution (LTE). More detailed descriptions of radio communication networks and systems can be found in literature, such as in Technical Specifications published by, e.g., the 3GPP. The core network (CN) of the evolved network architecture is sometimes referred to as Evolved Packet Core (EPC) and when referring to a complete cellular system, including both radio access network and core network, as well as other possible entities, such as service related entities, the term Evolved Packet System (EPS) can be used.

As a mere background only, FIG. 1A illustrates an example 3GPP LTE radio communication system 100. Accordingly, FIG. 1A illustrates a radio access network in an LTE radio communication system 100. In this example, there are two radio network nodes 110a and 110b, each of which is exemplified as an evolved NodeB, eNB. A first eNB 110a is configured to serve one or several UEs, 120a-e, located within the eNB's 100a geographical area of service or the radio cell 130a. The eNB 110a is connectable to a CN. The eNB 110a is also connectable, e.g. via an X2 interface, to a neighboring eNB 110b configured to serve another cell 130b. Accordingly, the second eNB 110b is configured to serve one or several UEs, 120f-j, located within the eNB's 100b geographical area of service or the cell 130b. The eNB 110b is also connectable to a CN.

A currently popular vision of the future development of the communication in radio communication networks comprises huge numbers of small autonomous devices, which typically, more or less infrequently (e.g. once per week to once per minute) transmit and receive only small amounts of data (or are polled for data). These devices are not assumed to be associated with humans, but are rather sensors or actuators of different kinds, which communicate with application servers (which configure the devices and receive data from them) within or outside the cellular network. Hence, this type of communication is often referred to as machine-to-machine (M2M) communication and the devices may be denoted machine devices (MDs). In the 3GPP standardization, the corresponding alternative terms are machine type communication (MTC) and machine type communication devices (MTC devices), with the latter being a subset of the more general term UE. More detailed descriptions of MTC communication can be found in literature, e.g., in the Technical Specification 3GPP TS 22.368 V.12.0.0.

With the nature of MTC devices and their assumed typical uses follow that these devices will often have to be energy efficient, since external power supplies will often not be available and since it is neither practically nor economically feasible to frequently replace or recharge their batteries. In some scenarios, the MTC devices may not even be battery powered, but may instead rely on energy harvesting, e.g. gathering energy from the environment, that is, utilizing (the often limited) energy that may be tapped from sun light, temperature gradients, vibrations, etc. For such energy deprived devices, whose traffic is characterized by relatively small and more or less infrequent transactions (often delay tolerant), it may be important to minimize their energy consumption, e.g. between and in conjunction with the communication events. These devices generally consume energy between the various communication events, e.g. by keeping the radio receiver active to monitor transmissions from the cellular network. Since the periods between the communication events are generally much longer than the actual communication events, this energy consumption may represent a significant part of the overall energy consumption and may even dominate the energy consumption in scenarios where the communication events are infrequent or very infrequent.

The inventors have realized that the actual uplink (UL) transmissions naturally consume significant amounts of energy during the communication events. This may be magnified by the relatively large control signaling overhead that may be associated with a certain communication event, especially since an infrequently communicating MTC device (or other UE) will generally go through the idle to connected mode transition prior to every communication event. FIG. 1B shows a signaling diagram illustrating an example message sequence during the idle to connected mode transition in LTE. As can be seen, the signaling procedure involved during idle to connected mode transition for a UE may be relatively extensive.

A mechanism that has been introduced in radio communication networks in order to save energy in the UEs, e.g. between communication events, is discontinuous reception (DRX), which allows a UE to remain in an energy-saving sleep state most of the time, while waking up to listen for pages in idle mode DRX or downlink resource assignments (i.e. downlink transmissions) in connected mode DRX. Furthermore, in order to make the DRX mechanism even more effective for energy MTC devices, 3GPP is currently working on extending the maximum DRX cycle length, and thus the sleep period, both for idle mode DRX cycle and the connected mode DRX cycle. A DRX cycle thus essentially consists of a sleep period followed by an active period and this cycle is repeated over and over again until the device is detached from the network. Typically, but not necessarily, the sleep period is longer than the active period. A DRX cycle may have a more complex structure than described above, e.g. including a few repetitions of a shorter DRX cycle at the end of the active period, but for the purpose of this disclosure, the simplified DRX cycle description suffices in order to understand the principles of the various embodiments described herein. The idle mode DRX cycle, i.e., the paging cycle, is generally configured in the UE through parameters in the system information (SI) that is broadcast in each radio cell, in conjunction with UE specific parameters in the form of IMSI modulo1024, and an optional UE specific DRX cycle length. Alternatively, it is also possible to configure a UE specific paging cycle. The connected mode DRX cycle and other DRX parameters (when used) may be configured in the UE through optional parameters typically in the RRCConnectionReconfiguration message, or later in connected mode. A more detailed description of DRX mechanisms can be found in literature, such as in the reference book 4G LTE/LTE-Advanced for Mobile Broadband by Erik Dahlman, Stefan Parkvall and Johan Sköld, Academic Press, 2011, ISBN:978-0-12-385489-6, see e.g. chapter 13.2.6 "Discontinuous Reception (DRX) and Component Carrier Deactivation". More detailed descriptions of DRX cycles can also be found in, e.g. 3GPP TS 36.304 V.11.3.0 (see e.g. chapter 7), 3GPP TS 36.300 V.11.5.0 (see e.g. chapter 12), 3GPP TS 36.321 V.11.2.0 (see e.g. chapter 5.7). As will be appreciated, the DRX mechanisms are defined for both idle mode and connected mode. Generally speaking, these DRX mechanisms are excellent UE energy saving mechanisms.

However, the inventors have realized that when the communication events are short and infrequent, each communication event is likely to be preceded by an idle to connected mode transition, and this transition is likely to take a significant portion of time from the whole time needed to perform the data transmission. The potential use of long connected mode DRX cycles may increase the risk of radio link failure during mobility between radio cells, which means that idle to connected mode transition may be triggered many times in such scenarios too. In addition, since the connection setup procedure often involves exchange of a large number of signaling messages, this control plane communication is likely to dominate i.e. comprise more messages, larger data volumes and consume more energy, over the user plane communication. Furthermore, since the signaling procedure involves many nodes in the network as well as significant processing in the network nodes, e.g. in order to set the appropriate configuration parameters, the time intervals separating the messages may be significant. Hence, having the MTC device (or other UE) actively listening for downlink transmissions during the entire idle to connected mode transition, due to the lack of DRX sleep mode possibilities, may cause an a relatively high UE energy consumption in many scenarios. In turn, this may have a significant negative impact on the battery lifetime of a UE, e.g. a MTC device.

SUMMARY

It is in view of the above considerations and others that the various embodiments disclosed herein have been made.

In one of its aspects, the technology presented herein concerns a method performed by a user equipment (UE). The UE is configured to be either in an idle mode (i.e. an idle state) or in a connected mode (i.e. a connected state). The method comprises applying a discontinuous reception (DRX) cycle during a time period when the UE is in transition from the idle mode to the connected mode. It is to be understood that although the DRX cycle may be applied during the entire time period during which the UE is in transition from the idle mode to the connected mode, the DRX cycle does not necessarily have to be applied during the entire transition from the idle mode to the connected mode. In other words, the DRX cycle is not necessarily applied during the entire time period during which the UE is in transition from the idle mode to the connected mode. Instead, the DRX cycle may be applied during a part, or portion, of the transition from the idle mode to the connected mode. That is, the DRX cycle may be applied during a part, or portion, of the time period during which the UE is in transition from the idle mode to the connected mode. The idle mode and the connected mode, respectively, may be RRC states. RRC is an abbreviation for Radio Resource Control as is known among persons skilled in the art. That is to say that the idle mode may be an RRC_IDLE mode. Also, the connected mode may be a RRC_CONNECTED mode.

This method differs from the existing prior art in that it allows for applying, or utilizing, a DRX mechanism during the time period when the UE is in transition from the idle mode (e.g. RRC_IDLE) to the connected mode (e.g. RRC_CONNECTED). In the existing art, neither the idle mode DRX cycle nor the connected mode DRX cycles are applied during the time period when the UE is in transition from the idle mode to the connected mode. Accordingly, in the existing art no DRX cycle is applied during the time period when the UE is in transition from the idle mode to the connected mode.

Advantageously, the above-mentioned DRX cycle may be a temporary DRX cycle. For example, the temporary DRX cycle may be applied only when the UE is in transition from the idle mode to the connected mode. When the UE has transitioned to the connected mode (e.g. RRC_CONNECTED), the temporary DRX cycle may be inactivated, or even invalidated. The DRX cycle may therefore be called temporary DRX cycle, since it is only utilized when the UE is in the transition from the idle mode to the connected mode. In some embodiments, the method may thus comprise ceasing to apply the temporary DRX cycle when the UE has transitioned to the connected mode (e.g. RRC_CONNECTED). Or said differently, the method may comprise stopping to apply the temporary DRX cycle upon the UE entering the connected mode.

The method may also comprise applying one or several DRX configuration parameters during the time period when the UE is in transition from the idle mode to the connected mode. Again, although the one or several DRX configuration parameters may be applied during the entire time period during which the UE is in transition from the idle mode to the connected mode, the one or several DRX configuration parameters are not necessarily applied during the entire time period during which the UE is in transition from the idle mode to the connected mode. Instead, the one or several DRX configuration parameters may be applied during a part, or portion, of the time period during which the UE is in transition from the idle mode to the connected mode.

In one embodiment, the method may comprise, prior to applying the DRX cycle during the time period when the UE is in transition from the idle mode to the connected mode, transmitting a data message to a radio network node, wherein the data message comprises a request to apply the DRX cycle during the time period when the UE is in transition from the idle mode to the connected mode. The method may also comprise, prior to applying the DRX cycle during the time period when the UE is in transition from the idle mode to the connected mode, receiving a data message from the radio network node, wherein the data message comprises an acknowledgement of said request.

In some embodiments, the method may comprise, prior to applying the DRX cycle during the time period when the UE is in transition from the idle mode to the connected mode, retrieving the DRX cycle to be applied during the time period when the UE is in transition from the idle mode to the connected mode. For example, retrieving the DRX cycle to be applied during the time period when the UE is in transition from the idle mode to the connected mode may comprise receiving a data message from a radio network node, the data message comprising information about the DRX cycle. Additionally, or alternatively, retrieving the DRX cycle to be applied during the time period when the UE is in transition from the idle mode to the connected mode may comprise retrieving information about the DRX cycle from a memory associated with the UE.

In some embodiments, the method may comprise, prior to applying the DRX cycle during the time period when the UE is in transition from the idle mode to the connected mode, retrieving DRX configuration parameter(s) to be applied during the time period when the UE is in transition from the idle mode to the connected mode. For instance, retrieving the DRX configuration parameter(s) to be applied during the time period when the UE is in transition from the idle mode to the connected mode may comprise receiving a data message from a radio network node, wherein the data message comprises the DRX configuration parameter(s). Additionally, or alternatively, retrieving the DRX configuration parameter(s) to be applied during the time period when the UE is in transition from the idle mode to the connected mode may comprise retrieving the DRX configuration parameter(s) from a memory associated with the UE.

In another of its aspects, the technology presented herein concerns a method performed by a radio network node. The method comprises transmitting a data message to a user equipment (UE), wherein the data message comprises information about a DRX cycle to be applied by the UE during the time period when the UE is in transition from the idle mode to the connected mode. The method may additionally comprise transmitting a data message to the UE, wherein the data message comprises DRX configuration parameter(s) to be applied by the UE during the time period when the UE is in transition from the idle mode to the connected mode.

In yet another of its aspects, the technology presented herein concerns a method performed by a radio network node. The method comprises receiving a data message from a user equipment (UE), wherein the data message comprises a request to apply a DRX cycle during the time period when the UE is in transition from the idle mode to the connected mode. The method may additionally comprise transmitting a data message to the UE, wherein the data message comprises an acknowledgement of said request.

In still another of its aspects, the technology presented herein concerns a user equipment (UE) configured to be either in an idle mode or in a connected mode. The UE comprises a processor, and a memory storing computer program code, which, when run in the processor causes the UE to apply a discontinuous reception (DRX) cycle during a time period when the UE is in transition from the idle mode to the connected mode. As mentioned earlier, although the DRX cycle may be applied during the entire time period during which the UE is in transition from the idle mode to the connected mode, the DRX cycle does not necessarily have to be applied during the entire transition from the idle mode to the connected mode. In other words, the DRX cycle is not necessarily applied during the entire time period during which the UE is in transition from the idle mode to the connected mode. Instead, the DRX cycle may be applied during a part, or portion, of the transition from the idle mode to the connected mode. That is, the DRX cycle may be applied during a part, or portion, of the time period during which the UE is in transition from the idle mode to the connected mode.

Also as mentioned earlier, the DRX cycle may be a temporary DRX cycle. For example, the memory may store computer program code, which, when run in the processor causes the UE to apply the temporary DRX cycle only when the UE is in transition from the idle mode to the connected mode.

In some embodiments, the memory may store computer program code, which, when run in the processor causes the UE to cease to apply the temporary DRX cycle when the UE has transitioned to the connected mode.

In some embodiments, the memory may store computer program code, which, when run in the processor causes the UE to apply one or several DRX configuration parameters during the time period when the UE is in transition from the idle mode to the connected mode.

For example, the UE may also comprise a transmitter configured to transmit a data message to a radio network node, wherein the data message comprises a request to apply the DRX cycle during the time period when the UE is in transition from the idle mode to the connected mode. Moreover, the UE may comprise a receiver configured to receive a data message from the radio network node, the data message comprising an acknowledgement of said request.

In some embodiments, the memory may also store computer program code, which, when run in the processor causes the UE to retrieve the DRX cycle to be applied during the time period when the UE is in transition from the idle mode to the connected mode. Also, the receiver may be configured to receive a data message from a radio network node, wherein the data message comprises information about the DRX cycle. Additionally, or alternatively, the memory may store computer program code, which, when run in the processor causes the UE to retrieve information about the DRX cycle from a memory associated with the UE.

Furthermore, the memory may store computer program code, which, when run in the processor causes the UE to retrieve the DRX configuration parameters to be applied during the time period when the UE is in transition from the idle mode to the connected mode. Also, the receiver may be configured to receive a data message from a radio network node, wherein the data message comprises the DRX configuration parameters. Additionally, or alternatively, the memory may store computer program code, which, when run in the processor causes the UE to retrieve the DRX configuration parameters from a memory associated with the UE.

The above-mentioned UE may be a Machine Type Communication (MTC) device.

In another of its aspects, the technology discussed herein concerns a radio network node. The radio network node comprises a transmitter configured to transmit a data message to a user equipment (UE), wherein the data message comprises information about a DRX cycle to be applied by the UE during the time period when the UE is in transition from the idle mode to the connected mode. The transmitter may also be configured to transmit a data message to the UE, wherein the data message comprises DRX configuration parameters to be applied by the UE during the time period when the UE is in transition from the idle mode to the connected mode.

The radio network node may be an evolved NodeB (eNB). Alternatively, the radio network node may be a Home Subscriber Server (HSS). Alternatively, the radio network node may be a Mobility Management Entity (MME). Yet further, it is conceivable that a distributed solution is utilized. That is, several of the eNB, HSS and MME may implement the herein described functionality of the radio network node in a distributed manner. It is also conceivable that embodiments described herein can be applied in a UMTS system, e.g. providing a W-CDMA or HSPA radio interface, in which case the radio network node may be a Node B, a Radio Network Controller (RNC), a HSS, a Home Location Register (HLR) or a Serving General Packet Radio Service Support Node (SGSN) or a distributed solution involving several of these nodes.

In still another of its aspects, the technology discussed herein concerns a radio network node. The radio network node comprises a receiver configured to receive a data message from a user equipment (UE), wherein the data message comprises a request to apply a DRX cycle during the time period when the UE is in transition from the idle mode to the connected mode. The radio network node may further comprise a transmitter configured to transmit a data message to the UE, wherein the data message comprises an acknowledgement of said request.

The radio network node may be an evolved NodeB (eNB). Alternatively, the radio network node may be a Home Subscriber Server (HSS). Alternatively, the radio network node may be a Mobility Management Entity (MME). Yet further, it is conceivable that a distributed solution is utilized. That is, several of the eNB, HSS and MME implement the herein described functionality of the radio network node in a distributed manner. It is also conceivable that embodiments described herein can be applied in a UMTS system, e.g. providing a W-CDMA or HSPA radio interface, in which case the radio network node may be a Node B, a Radio Network Controller (RNC), a HSS, a Home Location Register (HLR) or a Serving General Packet Radio Service Support Node (SGSN) or a distributed solution involving several of these nodes.

As will be appreciated and according to some of the embodiments described throughout this disclosure, it is proposed to apply a DRX cycle during a time period when the UE is in transition from the idle mode to the connected mode. Advantageously, the DRX cycle is temporary and applied only when the UE is in the transition from the idle mode to the connected mode. As soon as the UE is in connected mode, the normal (or, regular) connected mode DRX cycle can be applied in a conventional way.

Applying a DRX cycle in the time period between idle mode and connected mode provides several advantages. For example, this may allow the UE to save power during its transition from idle mode to connected mode. Indeed, much energy is generally consumed during the multitude of transitions between idle mode and connected mode. This may be particularly true for MTC devices, since the idle-to-connected mode transition signaling procedure may represent a significant part of the total communication for these devices. Therefore, allowing MTC devices to save power during the otherwise power-consuming idle-to-connected mode transition signaling procedure may be beneficial. It should be appreciated that the above advantage is not limited to MTC devices. Also other UEs, such as many of today's smartphones, would benefit from reducing power consumption during the idle-to-connected mode transition signaling procedure.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The technology will now be described more fully hereinafter with reference to the accompanying drawings, in which certain embodiments are shown. The technology may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements or method steps throughout the description.

As used in this disclosure, the term "user equipment (UE)" is used to mean any device, which can be used by a user to communicate. Also, the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC devices, which do not necessarily involve human interaction. Also, the term "radio network node" as used herein generally denotes a fixed point being capable of communicating with the UE. As such, it may be referred to as a base station, a radio base station, a NodeB or an evolved NodeB (eNB), a Radio Network Controller (RNC), access point, etcetera. Within the context of this disclosure it should be understood that the term "radio network node" may denote a node that is not necessarily part of what is typically referred to as a "radio access network", e.g. a Mobility Management Entity (MME), a Serving General Packet Radio Service Support Node (SGSN), a Home Subscriber Server (HSS) or a Home Location Register (HLR). Thus, when used herein the term "radio network node" may also include, e.g., CN nodes.

In one of its aspects, the technology presented herein concerns the application, or utilization, of a discontinuous reception (DRX) mechanism during a time period when a user equipment (UE) is in transition from an idle mode to a connected mode. It should be appreciated that although the DRX cycle may be applied during the entire time period during which the UE is in transition from the idle mode to the connected mode, the DRX mechanism does not necessarily have to be applied during the entire transition from the idle mode to the connected mode. In other words, the DRX mechanism is not necessarily applied during the entire time period during which the UE is in transition from the idle mode to the connected mode. Instead, the DRX mechanism may be applied during a part, or portion, of the transition from the idle mode to the connected mode. That is, the DRX mechanism may be applied during a part, or portion, of the time period during which the UE is in transition from the idle mode to the connected mode.

Figure 1A:
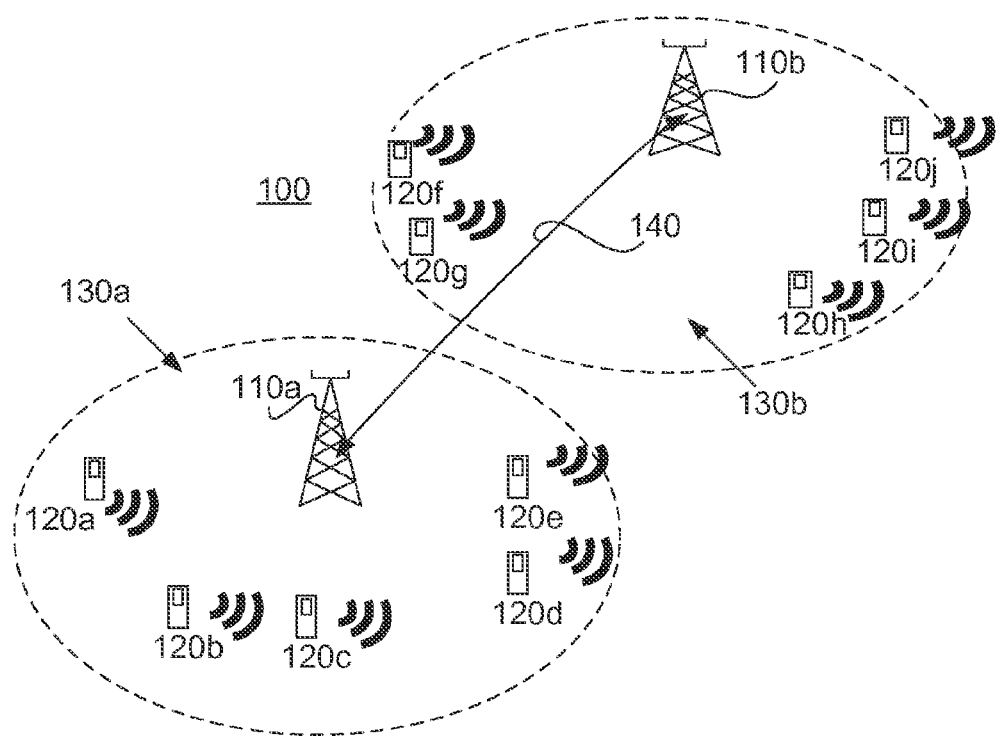
FIG. 1A shows an example 3GPP LTE radio communication system.
Figure 1B:
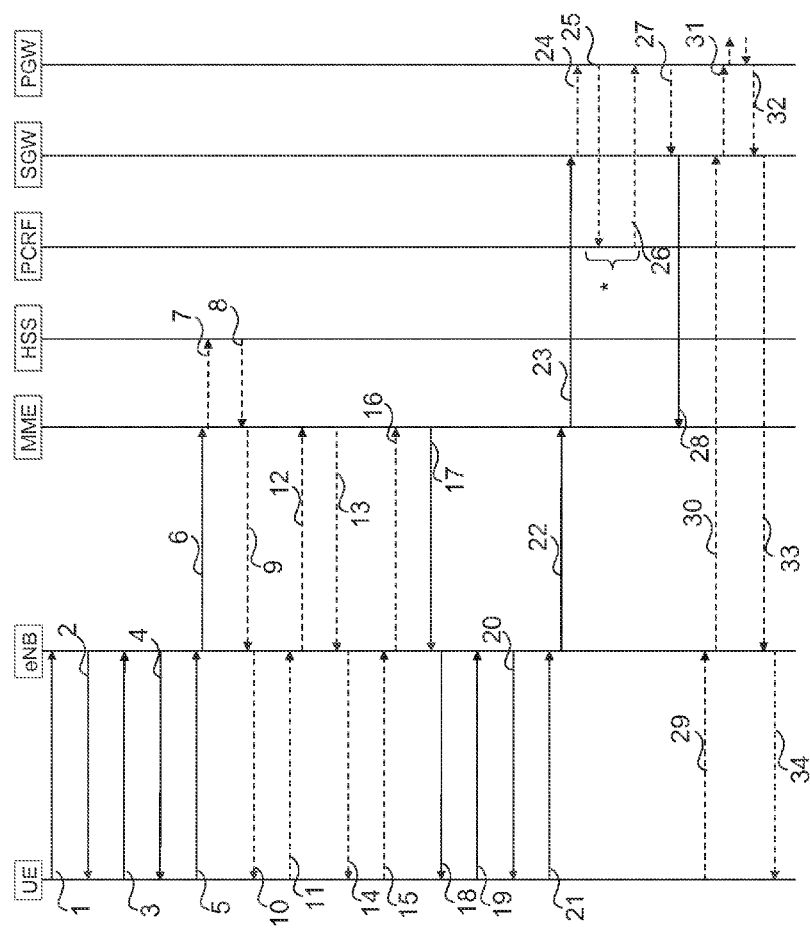
FIG. 1B shows a signaling diagram during a time period when a UE transitions from an idle mode to a connected mode.
Figure 2:
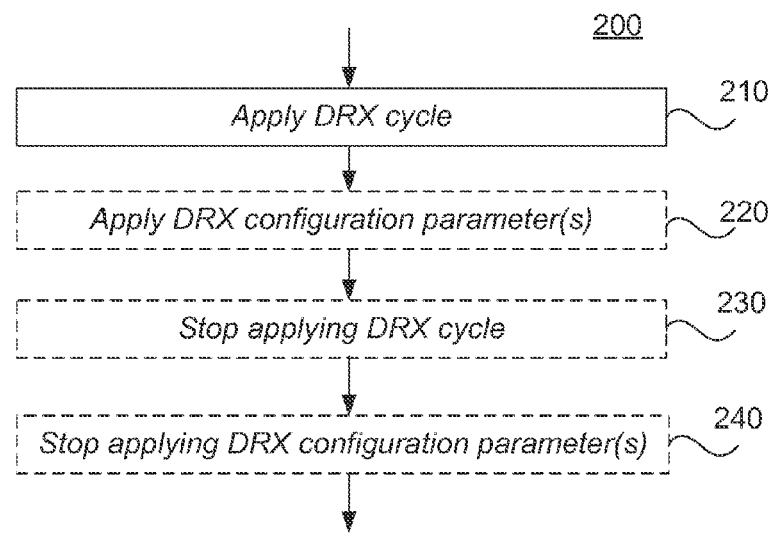
FIG. 2 shows a flowchart of a method according to an embodiment performed in a user equipment.

FIG. 2 shows a flowchart of a method implemented in a UE according to an example embodiment. That is, a method 200 performed by a UE is proposed. The UE is configured to be either in an idle mode (e.g. RRC_IDLE) or in a connected mode (e.g. RRC_CONNECTED). The method comprises applying 210 a DRX cycle during a time period when the UE is in transition from the idle mode to the connected mode. The DRX cycle may be a temporary DRX cycle. Furthermore, the temporary DRX cycle may be applied only when the UE is in transition from the idle mode to the connected mode. In other words, the temporary DRX cycle is not applied when the UE is in idle mode (e.g. RRC_IDLE). Similarly, the temporary DRX cycle is not applied when the UE is in connected mode (e.g. RRC_CONNECTED). Rather, the temporary DRX cycle is only applied when the UE is in a transition between the two modes, i.e. when the UE is in a transition from the idle mode to the connected mode. For example, the time period when the UE is in transition from the idle mode to the connected mode may be understood to mean the time period from step 1 (i.e. RA Msg 1, where RA is an abbreviation for Random Access) up to and including step 21 (i.e. RRCConnectionReconfigurationComplete) in FIG. 1B.

The method may preferably also comprise applying 220 one or several DRX configuration parameters during the time period when the UE is in transition from the idle mode to the connected mode. DRX configuration parameters may, for example, include one or more of the following parameters:

DRX start offset (which is generally used to define when the DRX cycle starts)
DRX cycle length
On Duration
On duration timer
DRX Inactivity Timer
DRX Retransmission Timer
Short DRX cycle
Short DRX cycle timer
The nB parameter (which is involved in the definition of idle mode DRX and is described in chapter 7 of 3GPP Technical Specification 36.304 V11.3.0 "$3^{rd}$ Generation Partnership Project; Technical Specification Group Radio Access Network; Evolved Universal Terrestrial Radio Access (E-UTRA); User Equipment (UE) procedures in idle mode (Release 11)")

The method may additionally comprise ceasing 230, or stopping, to apply the temporary DRX cycle when the UE has transitioned to the connected mode. That is, as soon as the UE enters connected mode (e.g. RRC_CONNECTED), the UE may stop applying the temporary DRX cycle. Upon entering the connected mode, the UE may begin applying the normal, or regular, connected mode DRX cycle.

Also, the method may additionally comprise ceasing 240, or stopping, to apply the DRX configuration parameters when the UE has transitioned to the connected mode. That is, as soon as the UE enters connected mode (e.g. RRC_CONNECTED), the UE may stop applying the DRX configuration parameters. Upon entering the connected mode, the UE may instead begin applying the normal, or regular, connected mode DRX configuration parameter(s).

Applying a DRX cycle (and optionally also the DRX configuration parameters) in the time period between idle mode and connected mode may allow the UE to save power during its transition from idle mode to connected mode. Indeed, much energy is generally consumed during the multitude of transitions between idle mode and connected mode. Therefore, it may be beneficial for many UEs devices to apply a temporary DRX cycle in the idle-to-connected mode transition signaling procedure, since this signaling procedure may represent a significant part of the total communication for these devices. Therefore, allowing UEs to save power during the otherwise power-consuming idle-to-connected mode transition signaling procedure may be advantageous for many devices.

Figure 3:
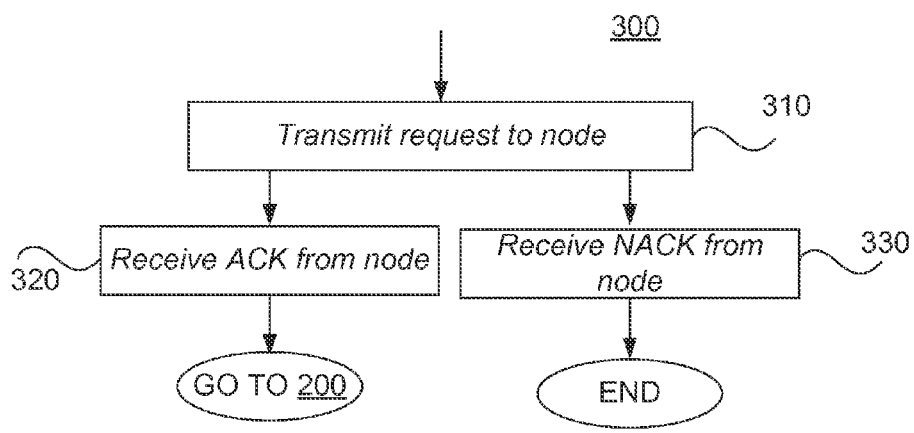
FIG. 3 shows a flowchart of a method according to an embodiment performed in a user equipment.
Figure 4A:
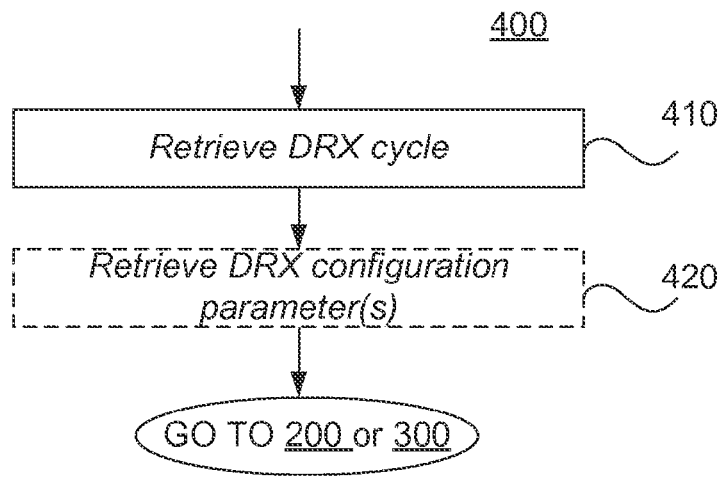
FIG. 4 shows a flowchart of a method according to an embodiment performed in a user equipment.
Figure 4B:
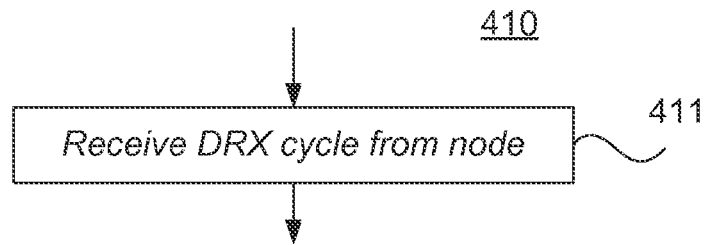
Figure 4C:
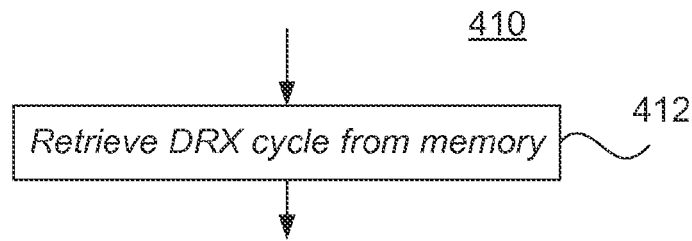
Figure 4D:
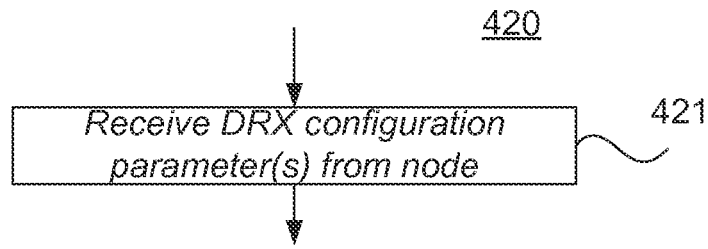
Figure 4E:
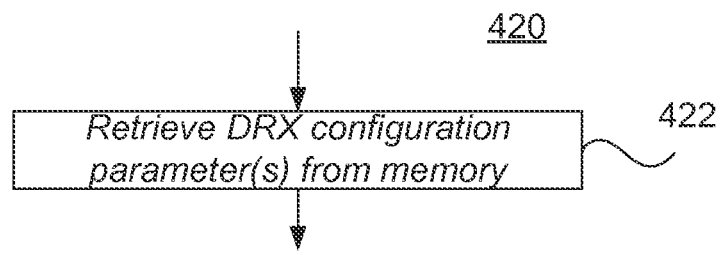

FIG. 3 shows a flowchart of a method 300 implemented in a UE according to another example embodiment. In this embodiment, the UE transmits 310 a data message to a radio network node, wherein the data message comprises a request to the radio network node to apply the DRX cycle during the time period when the UE is in transition from the idle mode to the connected mode. In other words, the UE can transmit an indication to a radio network node that it requests, or wishes, to apply the earlier-mentioned DRX cycle during its transition from idle mode to connected mode. In one example implementation, the above-mentioned data message comprises one or more data fields wherein at least one of the data fields comprises or otherwise indicates said request to apply the DRX cycle during the time period when the UE is in transition from the idle mode to the connected mode.

In response and if the radio network node accepts the request, the UE may receive 320 a data message from the radio network node, wherein the received data message comprises an acknowledgement (ACK) of said request. In one example implementation, the received data message includes one or more data fields where at least one of the data fields includes or otherwise indicates the ACK. Alternatively, if the radio network node does not accept the request, the UE may receive 330 a data message from the radio network node, wherein the received data message comprises a negative acknowledgement (NACK). In one example implementation, the received data message includes one or more data fields where at least one of the data fields includes or otherwise indicates the NACK. If, or when, the UE receives 320 the ACK from the radio network node, the method continues to the method 200 described hereinabove. In other words, the transmission 310 of the data message including the above-mentioned request as well as the reception 320 may be performed prior to the UE applying 210 (see FIG. 2) the idle-to-connected mode transition DRX cycle, i.e. the temporary DRX cycle.

FIG. 4 shows a flowchart of a method 400 implemented in a UE according to still another example embodiment. In this embodiment, the UE retrieves 410 the DRX cycle to be applied during the time period when the UE is in transition from the idle mode to the connected mode. For example, the retrieval 410 of the DRX cycle may comprise receiving 411 (see FIG. 4B) a data message from a radio network node, wherein this data message comprises information about the DRX cycle. For example, the data message may comprise one or more data fields wherein at least one of the data fields comprises or otherwise indicates the information about the DRX cycle. Alternatively, the retrieval 410 of the DRX cycle may comprise retrieving 412 (see FIG. 4C) information about the DRX cycle from a memory associated with the UE, e.g. a memory internal to the UE. Also, the method may optionally comprise retrieving 420 DRX configuration parameters to be applied during the time period when the UE is in transition from the idle mode to the connected mode. For example, the retrieval 420 of the DRX configuration parameters may comprise receiving 421 (see FIG. 4D) a data message from a radio network node, wherein this data message comprises the DRX configuration parameters. For example, the data message may comprise one or more data fields wherein at least one of the data fields comprises or otherwise indicates said DRX configuration parameters. Alternatively, the retrieval 420 of the DRX configuration parameters may comprise retrieving 422 (see FIG. 4E) the DRX configuration parameters from a memory associated with the UE, e.g. a memory internal to the UE. As is illustrated in FIG. 4A, the method 400 may precede the method 200 or method 300 described with reference to FIGS. 2 and 3, respectively.

It should be appreciated that retrieving 410 the DRX cycle to be applied during the time period when the UE is in transition from the idle mode to the connected mode may occur simultaneously, or substantially simultaneously, as retrieving 420 DRX configuration parameters to be applied during the time period when the UE is in transition from the idle mode to the connected mode. In other words, even if FIG. 4A indicates that these method steps, or actions, occur serially in two subsequent method steps or actions, it should be appreciated that these methods steps, or actions (i.e. 410 and 420), may occur simultaneously, or substantially simultaneously. Thus, in some embodiments these methods steps, or actions (i.e. 410 and 420), may be seen as occurring in one single method step, or action. Alternatively, these method steps, or actions (i.e. 410, 420) may occur in parallel.

Similarly, the method steps, or actions, of receiving 411 (see FIG. 4B) the data message from the radio network node, wherein this data message comprises information about the DRX cycle and receiving 421 (see FIG. 4D) a data message from a radio network node, wherein this data message comprises the DRX configuration parameters do not have to occur serially. Rather, these method steps, or actions, may occur simultaneously, or substantially simultaneously. For example, the data messages comprising information about the DRX cycle and the DRX configuration parameters, respectively, may be a single data message comprising both information about the DRX cycle and the DRX configuration parameters. Thus, these methods steps, or actions (i.e. 411 and 421) may be seen as occurring in one single method step, or action. Alternatively, these method steps, or actions (i.e. 411, 421) may occur in parallel.

Also in a similar manner, the method steps, or actions, of retrieving 412 (see FIG. 4C) information about the DRX cycle from a memory associated with the UE (e.g. a memory internal to the UE) and retrieving 422 (see FIG. 4E) the DRX configuration parameters from a memory associated with the UE (e.g. a memory internal to the UE) may occur serially, in parallel or simultaneously.

The methods 200, 300, and 400 described hereinabove may preferably, though not necessarily, be implemented in, or otherwise performed by, a MTC device.

Figure 5:
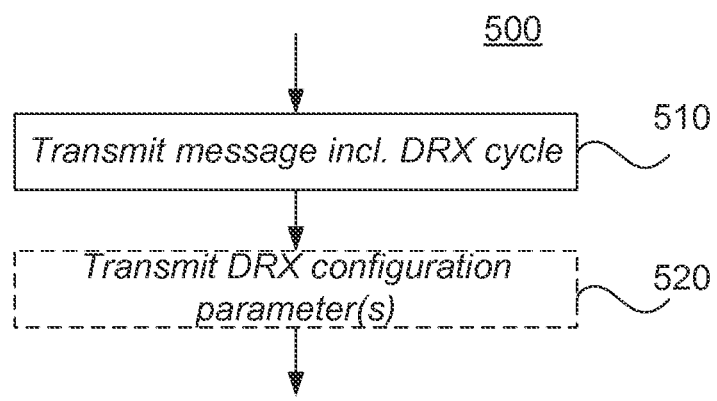
FIG. 5 shows a flowchart of a method according to an embodiment performed in a radio network node.

FIG. 5 shows a flowchart of a method 500 implemented in a radio network node according to an example embodiment. The radio network node transmits 510 a first data message to a user equipment (UE), wherein the first data message comprises information about a DRX cycle to be applied by the UE during the time period when the UE is in transition from the idle mode (e.g. RRC_IDLE) to the connected mode (e.g. RRC_CONNECTED). In one example implementation, the first data message may comprise one or more data fields wherein at least one of said data fields comprises or otherwise indicates the information about the DRX cycle to be applied by the UE during the time period when the UE is in transition from the idle mode to the connected mode. The method may preferably also include transmitting 520 a second data message to the UE, wherein the second data message comprises DRX configuration parameters to be applied by the UE during the time period when the UE is in transition from the idle mode to the connected mode. In one example implementation, the second data message may comprise one or more data fields wherein at least one of said data fields comprises or otherwise indicates said DRX configuration parameters to be applied by the UE during the time period when the UE is in transition from the idle mode to the connected mode.

For illustration purpose only, FIG. 5 illustrates the first and second data messages as two separate messages. However, the first and second data messages do not necessarily have to be transmitted in separate data messages. Instead, the first and second data messages may be sent in one single data message. In fact, those skilled in the art will appreciate that it may be preferred to transmit the first and second messages in one single data message.

Furthermore, it should also be appreciated that the method shown in FIG. 5 may be conditionally performed depending on whether the radio network node has received a data message from the UE requesting the radio network node to return the DRX cycle and/or the DRX configuration parameter(s).

Figure 6:
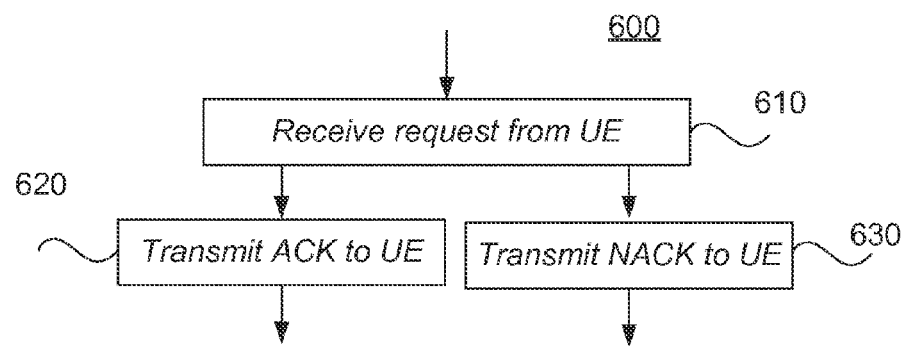
FIG. 6 shows a flowchart of a method according to an embodiment performed in a radio network node.

FIG. 6 shows a flowchart of a method 600 implemented in a radio network node according to another example embodiment. The method 600 comprises receiving 610 a data message from a user equipment (UE), wherein the data message comprises a request to apply a DRX cycle during the time period when the UE is in transition from the idle mode to the connected mode. Said data message may comprise one or more data fields where at least one of the data fields comprises or otherwise indicates the request to apply a DRX cycle during the time period when the UE is in transition from the idle mode to the connected mode If the radio network node accepts the received 610 request, the method may additionally comprise transmitting 620 a data message to the UE, wherein the data message comprises an acknowledgement (ACK) of said request. In one example implementation, the data message may include one or more data fields where at least one of the data fields includes or otherwise indicates the ACK. Alternatively, i.e. if the radio network node does not accept the received 610 request, the method may comprise transmitting 630 a data message to the UE, wherein the data message comprises a negative acknowledgement (NACK) of said request, thus, rejecting the received 610 request. In one example implementation, the data message may include one or more data fields where at least one of the data fields includes or otherwise indicates the NACK.

The radio network node may be an evolved NodeB (eNB). Alternatively, the radio network node may be a Home Subscriber Server (HSS). Alternatively, the radio network node may be a Mobility Management Entity (MME). Yet further, it is conceivable that a distributed solution can be utilized. That is, several of the eNB, HSS and MME implement the herein described functionality of the radio network node in a distributed manner. It is also possible that the embodiments described herein can be applied in a UMTS system, e.g. providing a W-CDMA or HSPA radio interface, in which case the radio network node may be a Node B, a Radio Network Controller (RNC), a HSS, a Home Location Register (HLR) or a Serving General Packet Radio Service Support Node (SGSN) or a distributed solution involving several of these nodes.

It should be appreciated that the methods 500 and 600 can be combined.

Some exemplary embodiments of the technology will now be described in some more detail hereinafter:

As is understood from the above, it is proposed to introduce a possibility to apply a DRX mechanism (i.e. DRX cycle and/or DRX configuration parameter(s)) during the idle to connected mode transition signaling procedure. The DRX cycle and/or the DRX configuration parameter(s) may be temporary. Thus, the DRX cycle and/or the DRX configuration parameter(s) may advantageously be used only during the idle to connected mode transition procedure. When the idle to connected mode transition signaling procedure is finalized, the temporary DRX configuration may be invalidated. Then, the connected mode DRX configuration which is generally conveyed in the RRCConnectionReconfiguration RRC message at the end of the idle to connected mode transition signaling procedure (see FIG. 1B) may take over. Alternatively, if no connected mode DRX is configured in the RRCConnectionReconfiguration RRC message, the UE may continue to operate without DRX mechanism in connected mode. As yet another alternative, if no connected mode DRX is configured in the RRCConnectionReconfiguration RRC message, the UE may continue to operate with the temporary DRX configuration (which is thus thereafter to be regarded as regular, non-temporary DRX configuration).

Various detailed embodiments will be described in the following. In order to support the application, or utilization, of a DRX mechanism during the idle to connected mode transition signaling procedure, novel DRX configuration possibilities are proposed herein below. This may be achieved in a number of different ways, which are elaborated in the subsections below. Following these subsections is also a subsection about avoidance of potential incompatibility challenges.

The signaling to use a temporary DRX mechanism during the idle to connected mode transition signaling procedure may comprise the following: 1) Indication of temporary DRX configuration usage, 2) Deriving the temporary DRX configuration.

In the first step, the UE may indicate to the network (or, rather, one or more radio network nodes of said network) that it will use or would prefer to use a temporary DRX configuration. In the latter case, the network may need to confirm the usage of the configuration. There are multiple options where the indication from the UE to the network may be included:

Indication in the RRCConnectionRequest message (see FIG. 1B);
Indication in the RRCConnectionSetupComplete message (see FIG. 1B);
Indication in the subscriber data;
Indication in a Non-Access Stratum (NAS) message (see e.g. 3GPP TS 24.301 V.11.4.0)
Indication in RA Msg1 (see FIG. 1B)
Based on device category or capability;

In the second step, the UE may derive the temporary configuration to be used during the RRC Connection Setup procedure (i.e. the idle to connected mode transition procedure) until the actual, semi-permanent configuration is received in the RRCConnectionReconfiguration message. The parameter types (e.g. various timers) used to define the temporary DRX configuration should preferably be the same as the ones used for definition of regular connected mode DRX configurations. There are multiple options for this:

The network may signal the temporary DRX configuration to the UE in the system information (SI);
The temporary DRX configuration may be signaled in the RRCConnectionSetup message;
The temporary DRX configuration may be preconfigured in subscriber data;
The temporary DRX configuration may be signaled in a NAS message (see e.g. 3GPP TS 24.301 V.11.4.0);
The temporary DRX configuration may be signaled in RA Msg2 (see e.g. FIG. 1)
The temporary DRX configuration may be hard-coded in accordance with future 3GPP technical specifications.

The above two steps (indication and derivation) may not necessarily occur in this order. The UE may retrieve the temporary DRX configuration before it indicates to the network that it will use or would prefer to use the temporary DRX configuration. The two steps may also be integrated with each other, so that the indication comprises the configuration parameters, in which case the two steps occur simultaneously, or essentially simultaneously.

1.1. Indication in the RRCConnectionRequest Message

In one embodiment, the UE is configured to indicate in the RRCConnectionRequest RRC message (see e.g. 3GPP TS 36.331 V.11.1.0) that it wishes to apply a temporary DRX configuration during the idle to connected mode signaling procedure. The indication, or request, could come in various shapes. In its simplest form the indication, or request, may be a flag, e.g. one bit, indicating that temporary DRX should be applied. The actual configuration parameters to be applied could then be either standardized or signaled in the system information (SI) message(s). A slightly more elaborated alternative would be to let the indication, or request, have the form of an index indicating one out of a set of possible temporary DRX configurations. The DRX configuration parameters that each index value maps to could be standardized or signaled in a SI message(s). Still another alternative would be that the UE includes the complete set of DRX configuration parameters in the RRCConnectionRequest message. A combination, where a subset of the temporary DRX configuration parameters are indicated in the RRCConnectionRequest message while the rest are standardized or signaled in the SI message(s) is also conceivable. Yet another possibility is to utilize one or both of the spare values of the establishmentCause IE (information element) to indicate that a preconfigured, temporary DRX configuration should be applied. Using both spare values provides the possibility to indicate two different temporary DRX configurations. The establishmentCause IE is further detailed in 3GPP TS 36.331. It would even be possible to change the interpretation of the value of the establishmentCause IE that currently indicates 'delay tolerant access' so that it also indicates that a preconfigured temporary DRX configuration is applied by the UE. The preconfigured parameters could be standardized or indicated in signaled system information. One possibility is to restrict the use of temporary DRX configuration to the delay tolerant establishment cause. One of the spare bits of the RRCConnectionRequest message can be used in combination with this establishment cause. An indication in the RRCConnectionRequest message combined with temporary DRX parameters in the system information is probably, but not necessarily, the most attractive of the alternatives presented herein. It allows the temporary DRX configuration to be applied immediately after the RRCConnectionRequest message and may allow an operator flexibility to define the actual parameters to be used for the temporary DRX configuration.

1.2. Indication in the RRCConnectionRequest and Configuration in the RRCConnectionSetup Messages In one embodiment, the UE and the eNB may "cooperate" to configure the temporary DRX cycle. The UE may, for example, indicate in the RRCConnectionRequest message, in either of the ways described above in section 1.1, that it wishes, or requests, to apply temporary DRX during the idle to connected mode transition signaling procedure. The eNB may then respond with the actual temporary DRX configuration parameters in the RRCConnectionSetupRRC message, thereby concluding the configuration.

1.3. Indication in the RRCConnectionSetupComplete Message

In one embodiment, the UE may indicate in the RRCConnectionSetupComplete message that it wishes, or requests, to apply a temporary DRX configuration during the idle to connected mode signaling procedure. This is similar to the alternative with indication in the RRCConnectionRequest message (see section 1.1). A difference is that the establishmentCause IE is not included in the RRCConnectionSetupComplete message, so the spare values of that IE are not used, or cannot be used.

A difference of this approach compared to the example of including the indication in the RRCConnectionRequest message is that the temporary DRX configuration cannot be applied until the RRCConnectionSetupComplete message has been sent, which means that the UE cannot save energy in DRX sleep mode while waiting for the RRCConnectionSetup RRC message (i.e. RA Msg4, see FIG. 1) from the eNB.

On the other hand, an advantage of this approach compared to the example of including the indication in the RRCConnectionRequest message is that there is generally more room for extensions in the RRCConnectionSetupComplete message than in the RRCConnectionRequest message (for which the ambition in 3GPP has been to keep it very short). As a result, according to the current RRC specification (see 3GPP TS 36.331 V.11.1.0), the RRCConnectionSetupComplete message can be extended with a non-critical extension, whereas the RRCConnectionRequest message cannot generally be extended in this manner. This makes it easier to include more elaborate information, such as a complete set of configuration parameters for the temporary DRX configuration in the RRCConnectionSetupComplete message.

1.4. Preconfigured in Subscriber Data

In one embodiment, the temporary DRX configuration is included in the subscriber data associated with the UE. Hence, it may be stored in the HSS (Home Subscriber Server) and in the USIM (Universal Subscriber Identity Module) in the UE. As described for the alternative of including an indication and potentially configuration in the RRCConnectionRequest message (see section 1.1), the indication (or, request) and configuration can come in various forms. The same indication alternatives as described in section 1.1 can be used in combination with this embodiment. The indication and/or configuration may be downloaded from the HSS to the MME (Mobility Management Entity) together with other subscriber data when the UE registers in the MME. From the MME the indication/temporary configuration may be forwarded to the eNB in the first message from the MME to the eNB in the idle to connected mode transition procedure, e.g. the Initial Context Setup Request S1AP message (message 17 in the message sequence of FIG. 1B) or the Downlink NAS Transport S1AP message carrying the Authentication Request NAS message (message 9 in the message sequence of FIG. 1B) (see e.g. also 3GPP TS 36.413 V11.1.0).

According to this embodiment, the UE can apply the temporary DRX configuration after sending the RRCConnectionSetupComplete message, since the eNB will receive the temporary DRX configuration indication (or full parameter set) from the MME before it sends its next message to the UE. Optionally, the eNB (and the UE) activates the temporary DRX configuration only if the eNB has previously received an indication in either the RRCConnectionRequest message (a new indication, e.g. one of the currently unused values of the establishmentCause IE, or tied to an existing value of the establishmentCause IE) or the RRCConnectionSetupComplete message. If this option is used, it should preferably be extended such that the indication from the UE triggers the eNB to include a similar indication in the Initial UE Message S1AP message (i.e. message 6 in the message sequence of FIG. 1B) to trigger the MME to forward the temporary DRX configuration information to the eNB (and in the absence of such an indication from the eNB the MME would not forward the temporary DRX configuration information). After receiving the indication in the RRCConnectionRequest message or based on some other reason, the eNB may optionally confirm usage of temporary DRX configuration in the RRCConnectionSetup message with a one bit flag.

1.5. Explicit Indication in a NAS Message

According to one embodiment, the UE indicates in a NAS (Non-Access Stratum) message to the MME that it wishes (or requests) to apply a temporary DRX configuration during the idle to connected mode transition signaling procedure. The NAS message (see e.g. 3GPP TS 24.301 V11.4.0) should preferably, but not necessarily, be the one that is included in the RRCConnectionSetupComplete RRC message (i.e. message 5 in the message sequence of FIG. 1B).

In FIG. 1B this NAS message is a Service Request NAS message, but in other scenarios it may also be another NAS message, such as an Attach Request NAS message, an Extended Service Request NAS message or a Tracking Area Update Request NAS message.

In order to inform the eNB, the MME can forward the indication (or, request) to the eNB in the Initial Context Setup Request S1AP message (i.e. message 17 in the message sequence of FIG. 1B) or the Downlink NAS Transport S1AP message carrying the Authentication Request NAS message (i.e. message 9 in the message sequence of FIG. 1B).

It will be appreciated that the same examples for the indication, or request, as described in section 1.1 may be used in combination with this embodiment.

According to this embodiment, the UE can apply the temporary DRX configuration after sending the indication in the NAS message, i.e. after sending the RRCConnectionSetupComplete message, since (similar to the case where the temporary DRX indication is included in the subscriber data) the eNB will receive the temporary DRX configuration indication (or full parameter set) from the MME before it sends its next message to the UE.

1.6. Based on Device Category or Capability

According to another embodiment, the indication is associated with a category or capability of the UE. It could then be included in any of the IEs in the Attach Request NAS message that indicates various properties of the UE, i.e. the UE network capability IE, the MS network capability IE, the Mobile station classmark 2 IE or the Device properties IE. As these IEs are included in a NAS message they are delivered to the MME. Hence, the MME can inform the eNB so that it may apply the temporary DRX configuration. The MME can do this by forwarding the indication to the eNB in the Initial Context Setup Request S1AP message (i.e. message 17 in the message sequence of FIG. 1B) or the Downlink NAS Transport S1AP message carrying the Authentication Request NAS message (i.e. message 9 in the message sequence of FIG. 1B). Again, the same examples for the indication as described in section 1.1 may be used also with this embodiment, i.e. in combination with this embodiment.

After receiving the temporary DRX indication (irrespective of its level of elaboration) the MME would keep it in the UE context (i.e. its records of UE associated information) and in case of an MME relocation, the indication would be forwarded to the new MME.

Another, more preferable variant of basing the solution on the UE capability is to make use of radio capability related parameters. In this variant the UE-EUTRA-Capability IE may be extended with the temporary DRX indication/configuration. The same elaboration alternatives for the indication as described in section 1.1 may be used also with this alternative.

In the current RRC specification (see e.g. 3GPP TS 36.331 V11.1.0), the UE-EUTRA-Capability IE is included in the ue-CapabilityRAT-Container IE, which in turn is included in the ue-CapabilityRAT-ContainerList IE in the UECapabilityInformation message.

In conjunction with the Attach procedure (i.e. when the UE first registers in the network and relevant contexts are established in core network nodes, such as the MME, the SGW and the PGW) the eNB may request the capability information from the UE by sending the RRC message UECapabilityEnquiry to the UE. The UE may then respond with the RRC message UECapabilityInformation, including the capability information as described above. The eNB may then forward the information to the MME as follows. It includes the UECapabilityInformation message in a ue-RadioAccessCapabilityInfo IE, which it includes in a UERadioAccessCapabilityInformation message (which is specified as an RRC message), which in turn is included in a UE Radio Capability IE, which the eNB sends to the MME in the S1AP message UE CAPABILITY INFO INDICATION. The MME may store the UE capability information in its UE context and keeps it for as long as the UE remains attached to the network (and transfers it to a new MME in case of MME relocation).

In subsequent cases (during the same attach session) where the UE connects to the network, i.e. transits from idle to connected mode, the MME transfers the UE capability information to the eNB in the in the UE Radio Capability IE in the S1AP message INITIAL UE CONTEXT SETUP REQUEST (message 17 in the message sequence in FIG. 1B). The UE Radio Capability IE is optional in the INITIAL UE CONTEXT SETUP REQUEST message and during the Attach procedure it is absent. This absence triggers the eNB to request the information from the UE and forward it to the MME, as described above.

This mechanism may allow the eNB to apply the temporary DRX configuration when it has received the UE capability information from the MME, i.e. starting with the transmission of message 18 in FIG. 1B, i.e. the downlink RRC message SecurityModeCommand. From the UE's perspective this means that it may apply the temporary DRX configuration after receiving the preceding downlink message in the sequence, i.e. after receiving message 14 in FIG. 1B. Note that messages 7-16 are optional in the message sequence of FIG. 1B, but the UE cannot know in advance whether they will be used or not. Therefore the UE cannot apply the temporary DRX configuration after receiving the RRCConnectionSetup message (message 4 in FIG. 1B), which means that if messages 7-16 in FIG. 1B are not used, the UE will not apply the temporary DRX configuration until it has received the SecurityModeCommand message (message 18 in FIG. 1B) from the eNB.

Similar to the embodiment with the temporary DRX indication in the subscriber data (see section 1.4) an option is to let the activation of the temporary DRX configuration be triggered by an indication from the UE, using the same mechanism as described in section 1.4. This option may be used with both the method variants elaborated in this section.

1.7 Indication in a MAC Control Element

In one embodiment, the UE indicates in a MAC (Medium Access Control) Control Element that it wishes, or requests, to apply a temporary DRX configuration during the idle to connected mode signaling procedure. The MAC Control Element would preferably be included in the MAC PDU (Protocol Data Unit) carrying one of the uplink RRC messages, e.g. (preferably) the RRCConnectionRequest RRC message or the RRCConnectionSetupComplete RRC message, but it could also be conveyed in a separate MAC PDU (i.e. a MAC PDU without SDU). Optionally, the indication could be confirmed by the eNB in a MAC Control Element in a subsequent downlink MAC PDU, preferably a MAC PDU carrying one of the downlink RRC messages, e.g. the RRCConnectionSetup RRC message (assuming that the indication was conveyed in the MAC PDU carrying the RRCConnectionRequest RRC message). The same alternatives of the temporary DRX indication as described in section 1.1 may be used in combination with this embodiment, e.g. a flag or an index, full or partial configuration (or a combination).

1.8. Indication in RA Msg1 and/or RA Msg2

With this embodiment, the indication (or request) of application of a temporary DRX configuration is included in the first and/or the second message of the random access procedure, i.e. RA Msg1 (random access preamble) or RA Msg2 (Random Access Response MAC PDU) (messages 1 and 2 in the message sequence of FIG. 1B) (see e.g. also 3GPP TS 36.321 V11.0.0). If RA Msg1 is used, the only means to indicate anything is to use a preamble from a dedicated group of preambles. This implies that the current (maximum) two preamble groups, A and B, would have to be complemented with another preamble group for indication of temporary DRX configuration. A preamble from this group would indicate that temporary DRX configuration is applied by the UE during the idle to connected mode transition signaling procedure. The actual temporary DRX configuration parameters could be standardized or specified in the system information. If it is desired to be able to indicate one out of a set of temporary DRX configurations, then a preamble group would have to be defined for each set. Such preamble groups would be indicated in the system information, just as the presently existing preamble groups A and B. Alternatively, the preamble from a dedicated preamble group may be considered as a request for temporary DRX configuration to be used, whereby this must be confirmed by the eNB, (which optionally also may provide the actual configuration parameters). The eNB would confirm the usage of the temporary DRX configuration in RA Msg2, which thus may include an indication/configuration of temporary DRX with any of the elaboration alternatives described in section 1.1, i.e. a flag, an index, full or partial configuration (or a combination). A possible variant of using RA Msg2 for this purpose could be that the eNB takes the initiative to configure the UE with temporary DRX without a prior indication from the UE.

1.9 Avoidance of Incompatibility Problems—Indication of Support of Temporary DRX in the Cell For those of the above described embodiments where the UE takes some action related to the temporary DRX feature before or without receiving any indication of support for the temporary DRX feature in the cell, it may be beneficial to include a parameter in the system information (SI) indicating support of the temporary DRX feature in the cell. Absence of this indication would then imply lack of support, which would make the UE refrain from the temporary DRX feature related action(s) that could otherwise cause incompatibility problems.

Such actions could be that the UE sends an indication of intention and/or desire to use the temporary DRX feature or that the UE starts using the temporary DRX feature. The potential incompatibility problems that may be avoided by refraining from such actions could be e.g. that the eNB rejects (or discards) a message from the UE including a temporary DRX related indication that the eNB does not understand (or support), e.g. the RRCConnectionRequest RRC message or the RRCConnectionSetupComplete RRC message, that the MME rejects a NAS message including a temporary DRX related indication or that the UE one-sidedly starts using the temporary DRX feature, i.e. goes into DRX sleep mode, causing the UE to miss downlink signaling messages from the eNB.

Figure 7:
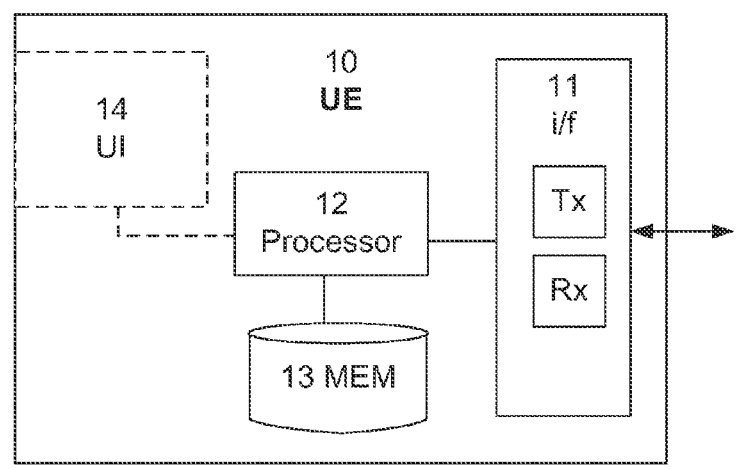
FIG. 7 shows an example embodiment of a user equipment.

Turning now to FIG. 7, an example embodiment of a user equipment (UE) 10 will be described. The UE 10 may preferably, though not necessarily, be embodied as a MTC device. Furthermore, the UE 10 is configured to be either in an idle mode (e.g. RRC_IDLE) or in a connected mode (e.g. RRC_CONNECTED). In this embodiment, the UE 10 comprises an interface module 11, a processor 12, and a memory 13. Optionally, the UE 10 may also comprise a user interface 14 through which a user can operate and interact with the UE 10. The interface module 11 may comprise a transmitting module (Tx), or transmitter. The interface module may also comprise a receiving module (Rx), or receiver. Alternatively, the interface module 11 may comprise a transceiving module (Tx/Rx), or transceiver, with both transmission and reception capabilities.

The memory 13 may store computer program code, which, when run in the processor 12 causes the UE 10 to apply a discontinuous reception, DRX, cycle during a time period when the UE is in transition from the idle mode to the connected mode. As mentioned earlier, the DRX cycle may be a temporary DRX cycle. For example, the memory 13 may store computer program code, which, when run in the processor 12 causes the UE 10 to apply the temporary DRX cycle only when the UE is in transition from the idle mode to the connected mode.

In some embodiments, the memory 13 may store computer program code, which, when run in the processor 12 causes the UE 10 to cease, or stop, to apply the temporary DRX cycle when the UE has transitioned to the connected mode (e.g. RRC_CONNECTED).

In some embodiments, the memory 13 may also store computer program code, which, when run in the processor 12 causes the UE 10 to apply one or several DRX configuration parameters during the time period when the UE is in transition from the idle mode to the connected mode.

Yet further, the transmitter 11 may be configured to transmit a data message to a radio network node, wherein the data message comprises a request to apply the DRX cycle during the time period when the UE 10 is in transition from the idle mode to the connected mode. Moreover, the receiver 11 may be configured to receive a data message from the radio network node, the data message comprising an acknowledgement of said request.

In some embodiments, the memory 13 may also store computer program code, which, when run in the processor 12 causes the UE 10 to retrieve the DRX cycle to be applied during the time period when the UE 10 is in transition from the idle mode to the connected mode. Also, the receiver 11 may be configured to receive a data message from a radio network node, wherein the data message comprises information about the DRX cycle. Additionally, or alternatively, the memory 13 may store computer program code, which, when run in the processor 12 causes the UE 10 to retrieve information about the DRX cycle from a memory associated with the UE 10. The memory associated with the UE 10 may be the memory denoted 11. Alternatively, it may be another memory (not shown) of the UE 10. Yet further, it may be another memory (not shown) which is external to the UE 10, i.e. not an integral part of the UE 10.

Furthermore, the memory 13 may store computer program code, which, when run in the processor 12 causes the UE 10 to retrieve the DRX configuration parameters to be applied during the time period when the UE is in transition from the idle mode to the connected mode. Also, the receiver 11 may be configured to receive a data message from a radio network node, wherein the data message comprises the DRX configuration parameters. Additionally, or alternatively, the memory 13 may store computer program code, which, when run in the processor 12 causes the UE 10 to retrieve the DRX configuration parameters from a memory associated with the UE. Again, the memory associated with the UE 10 may be the memory denoted 11. Alternatively, it may be another memory (not shown) of the UE 10. Yet further, it may be another memory (not shown) which is external to the UE 10, i.e. the memory is not necessarily an integral part of the UE 10.

Figure 8:
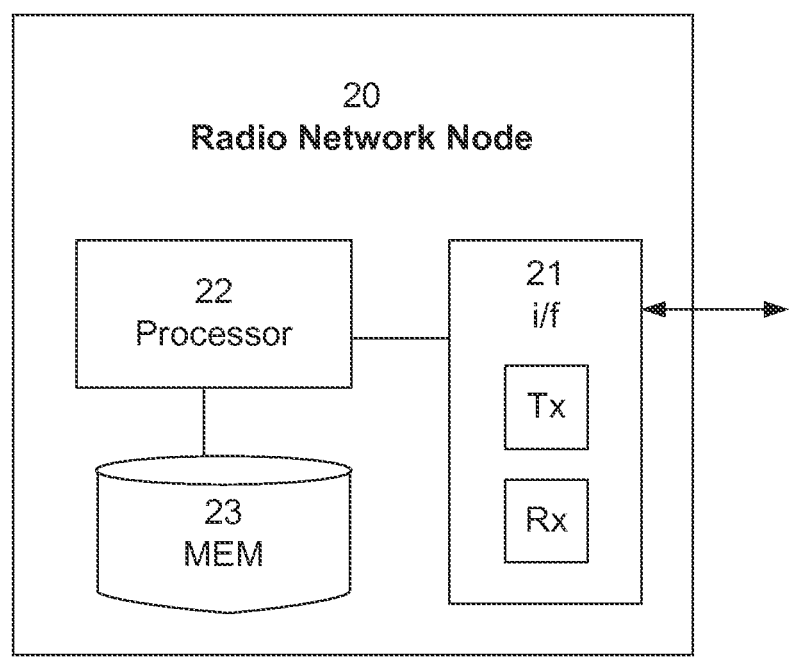
FIG. 8 shows an example embodiment of a radio network node.

Turning to FIG. 8, an example embodiment of a radio network node 20 will be described. According to this example embodiment, the radio network node 20 comprises an interface module 21. The interface module 21 may comprise a transmitting module (Tx), or transmitter. The interface module 21 may also comprise a receiving module (Rx), or receiver. Alternatively, the interface module 21 may comprise a transceiving module (Tx/Rx), or transceiver, with both transmission and reception capabilities.

The transmitter 21 may be configured to transmit a data message to a user equipment (UE), wherein the data message comprises information about a DRX cycle to be applied by the UE during the time period when the UE is in transition from the idle mode to the connected mode. The transmitter 21 may also be configured to transmit a data message to the UE, wherein the data message comprises DRX configuration parameters to be applied by the UE during the time period when the UE is in transition from the idle mode to the connected mode.

The receiver 21 may be configured to receive a data message from a user equipment (UE), wherein the data message comprises a request to apply a DRX cycle during the time period when the UE is in transition from the idle mode to the connected mode. In response, the transmitter 21 may be configured to transmit a data message to the UE, wherein the data message comprises an acknowledgement (ACK) of said request. Alternatively, the transmitter 21 may be configured to transmit a data message to the UE, wherein the data message comprises a negative acknowledgement (NACK) of said request.

The radio network node may be an evolved NodeB (eNB). Alternatively, the radio network node may be a Home Subscriber Server (HSS). Alternatively, the radio network node may be a Mobility Management Entity (MME). Yet further, it is conceivable that a distributed solution is utilized. That is, one or several of the eNB, HSS and MME may implement the herein described functionality of the radio network node in a distributed manner.

According to some of the embodiments described throughout this disclosure, it is proposed to apply a DRX cycle during a time period when the UE is in transition from the idle mode to the connected mode. Advantageously, the DRX cycle is temporary and applied only when the UE is in the transition from the idle mode to the connected mode. As soon as the UE is in connected mode, the normal (or, regular) connected mode DRX cycle can be applied in a conventional way. Applying a DRX cycle also in the time period between idle mode and connected mode may provide many advantages as described hereinabove. For example, this may allow the UE to save power during its transition from idle mode to connected mode. Allowing UEs to save power during the otherwise power-consuming idle-to-connected mode transition signaling procedure may be beneficial to many UEs, particularly (though not exclusively) MTC devices.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Although the various embodiments of this disclosure have been described above with reference to specific embodiments, it is not intended to be limited to the specific form set forth herein. For example, while many of the various embodiments have been described mainly with respect to EPS/LTE, it will come to mind to one skilled in the art having benefit of the teachings presented in the foregoing description and associated drawings that the general principles and concepts described herein can equally possible be utilized in e.g. UMTS/WCDMA/HSPA.

SELECTED EXAMPLE EMBODIMENTS

The technology disclosed herein thus encompasses without limitation the following example embodiments:

Example Embodiment M1

A method performed by a user equipment, UE, wherein the UE is configured to be either in an idle mode or in a connected mode, the method comprising:

applying a discontinuous reception, DRX, cycle during a time period when the UE is in transition from the idle mode to the connected mode.

Example Embodiment M2

The method according to example embodiment M1, wherein the DRX cycle is a temporary DRX cycle.

Example Embodiment M3

The method according to example embodiment M2, wherein the temporary DRX cycle is applied only when the UE is in transition from the idle mode to the connected mode.

Example Embodiment M4

The method according any one of the example embodiments M2-M3, further comprising:
 ceasing to apply the temporary DRX cycle when the UE has transitioned to the connected mode.

Example Embodiment M5

The method according to any one of the example embodiments M1-M4, further comprising:
 applying one or several DRX configuration parameters during the time period when the UE is in transition from the idle mode to the connected mode.

Example Embodiment M6

The method according to any one of the example embodiments M1-M5, further comprising, prior to applying the DRX cycle during the time period when the UE is in transition from the idle mode to the connected mode:
 transmitting a data message to a radio network node, the data message comprising a request to apply the DRX cycle during the time period when the UE is in transition from the idle mode to the connected mode.

Example Embodiment M7

The method according to the example embodiment M6, further comprising, prior to applying the DRX cycle during the time period when the UE is in transition from the idle mode to the connected mode:
 receiving a data message from the radio network node, the data message comprising an acknowledgement of said request.

Example Embodiment M8

The method according to any one of the example embodiments M1-M7, further comprising, prior to applying the DRX cycle during the time period when the UE is in transition from the idle mode to the connected mode:
 retrieving the DRX cycle to be applied during the time period when the UE is in transition from the idle mode to the connected mode.

Example Embodiment M9

The method according to example embodiment M8, wherein retrieving the DRX cycle to be applied during the time period when the UE is in transition from the idle mode to the connected mode comprises:
 receiving a data message from a radio network node, the data message comprising information about the DRX cycle.

Example Embodiment M10

The method according to example embodiment M8, wherein retrieving the DRX cycle to be applied during the time period when the UE is in transition from the idle mode to the connected mode comprises:
 retrieving information about the DRX cycle from a memory associated with the UE.

Example Embodiment M11

The method according to any one of the example embodiments M1-M10, further comprising, prior to applying the DRX cycle during the time period when the UE is in transition from the idle mode to the connected mode:
 retrieving DRX configuration parameters to be applied during the time period when the UE is in transition from the idle mode to the connected mode.

Example Embodiment M12

The method according to example embodiment M11, wherein retrieving the DRX configuration parameters to be applied during the time period when the UE is in transition from the idle mode to the connected mode comprises:
 receiving a data message from a radio network node, the data message comprising the DRX configuration parameters.

Example Embodiment M13

The method according to example embodiment M11, wherein retrieving the DRX configuration parameters to be applied during the time period when the UE is in transition from the idle mode to the connected mode comprises:
 retrieving the DRX configuration parameters from a memory associated with the UE.

Example Embodiment M14

The method according to any of the previous example embodiments, wherein the time period when the UE is in transition from idle mode to connected mode begins when the UE transmits (i.e. sends) an initial Random Access message (see FIG. 1).

Example Embodiment M15

The method according to any of the previous example embodiments, wherein the time period when the UE is in transition from idle mode to connected mode ends when the UE transmits (i.e. sends) a RRCConnectionReconfigurationComplete message (see FIG. 1).

Example Embodiment M16

The method according to any of the previous example embodiments, wherein applying the DRX cycle is started after a transmission or a reception of a data message during the time period when the UE is in transition from idle mode to connected mode (see FIG. 1).

Example Embodiment M17

The method according to example embodiment M16, wherein applying the DRX cycle is started after a transmission of a RRCConnectionRequest message (see FIG. 1).

Example Embodiment M18

A method performed by a radio network node, the method comprising:
  transmitting a data message to a user equipment, UE, the data message comprising information about a DRX cycle to be applied by the UE during the time period when the UE is in transition from the idle mode to the connected mode.

Example Embodiment M19

The method according to example embodiment M18, further comprising:
  transmitting a data message to the UE, the data message comprising DRX configuration parameters to be applied by the UE during the time period when the UE is in transition from the idle mode to the connected mode.

Example Embodiment M20

A method performed by a radio network node, the method comprising:
  receiving a data message from a user equipment, UE, the data message comprising a request to apply a DRX cycle during the time period when the UE is in transition from the idle mode to the connected mode.

Example Embodiment M21

The method according to the example embodiment M20, further comprising:
  transmitting a data message to the UE, the data message comprising an acknowledgement of said request.

Example Embodiment U1

A user equipment, UE, configured to be either in an idle mode or in a connected mode, the UE comprising:
  a processor; and
  a memory storing computer program code, which, when run in the processor causes the UE to apply a discontinuous reception, DRX, cycle during a time period when the UE is in transition from the idle mode to the connected mode.

Example Embodiment U2

The UE according to example embodiment U1, wherein the DRX cycle is a temporary DRX cycle.

Example Embodiment U3

The UE according to example embodiment U2, wherein the memory stores computer program code, which, when run in the processor causes the UE to apply the temporary DRX cycle only when the UE is in transition from the idle mode to the connected mode.

Example Embodiment U4

The UE according any one of the example embodiments U2-U3, wherein the memory stores computer program code, which, when run in the processor causes the UE to cease to apply the temporary DRX cycle when the UE has transitioned to the connected mode.

Example Embodiment U5

The UE according to any one of the example embodiments U1-U4, wherein the memory stores computer program code, which, when run in the processor causes the UE to apply one or several DRX configuration parameters during the time period when the UE is in transition from the idle mode to the connected mode.

Example Embodiment U6

The UE according to any one of the example embodiments U1-U5, further comprising a transmitter configured to transmit a data message to a radio network node, the data message comprising a request to apply the DRX cycle during the time period when the UE is in transition from the idle mode to the connected mode.

Example Embodiment U7

The UE according to the example embodiment U6, further comprising a receiver configured to receive a data message from the radio network node, the data message comprising an acknowledgement of said request.

Example Embodiment U8

The UE according to any one of the example embodiments U1-U7, wherein the memory stores computer program code, which, when run in the processor causes the UE to retrieve the DRX cycle to be applied during the time period when the UE is in transition from the idle mode to the connected mode.

Example Embodiment U9

The UE according to example embodiment U8, wherein the receiver is configured to receive a data message from a radio network node, the data message comprising information about the DRX cycle.

Example Embodiment U10

The UE according to example embodiment U8, wherein the memory stores computer program code, which, when run in the processor causes the UE to retrieve information about the DRX cycle from a memory associated with the UE.

Example Embodiment U11

The UE according to any one of the example embodiments U1-U10, wherein the memory stores computer program code, which, when run in the processor causes the UE to retrieve the DRX configuration parameters to be applied during the time period when the UE is in transition from the idle mode to the connected mode.

Example Embodiment U12

The UE according to example embodiment U11, wherein the receiver is configured to receive a data message from a radio network node, the data message comprising the DRX configuration parameters.

Example Embodiment U13

The UE according to example embodiment U11, wherein the memory stores computer program code, which, when run in the processor causes the UE to retrieve the DRX configuration parameters from a memory associated with the UE.

Example Embodiment U14

The UE according to any of the example embodiments U1-U13, wherein the time period when the UE is in transition from idle mode to connected mode begins when the UE transmits (i.e. sends) an initial Random Access message (see FIG. 1).

Example Embodiment U15

The UE according to any of the example embodiments U1-U14, wherein the time period when the UE is in transition from idle mode to connected mode ends when the UE transmits (i.e. sends) a RRCConnectionReconfiguration-Complete message (see FIG. 1).

Example Embodiment U16

The UE according to any of the example embodiments U1-U15, wherein applying the DRX cycle is started after a transmission or a reception of a data message during the time period when the UE is in transition from idle mode to connected mode (see FIG. 1).

Example Embodiment U17

The UE according to example embodiment U16, wherein applying the DRX cycle is started after a transmission of a RRCConnectionRequest message (see FIG. 1).

Example Embodiment N1

A radio network node, comprising:
a transmitter configured to transmit a data message to a user equipment, UE, the data message comprising information about a DRX cycle to be applied by the UE during the time period when the UE is in transition from the idle mode to the connected mode.

Example Embodiment N2

The radio network node according to example embodiment N1, wherein the transmitter is configured to transmit a data message to a user equipment, UE, the data message comprising DRX configuration parameters to be applied by the UE during the time period when the UE is in transition from the idle mode to the connected mode.

Example Embodiment N3

The radio network node according to example embodiment N1 or N2, wherein the radio network node comprises one or several of the following: an evolved NodeB (eNB), a Home Subscriber Server (HSS), a Mobility Management Entity (MME).

Example Embodiment N4

A radio network node, comprising:
a receiver configured to receive a data message from a user equipment, UE, the data message comprising a request to apply a DRX cycle during the time period when the UE is in transition from the idle mode to the connected mode.

Example Embodiment N5

The radio network node according to the example embodiment N4, further comprising a transmitter configured to transmit a data message to the UE, the data message comprising an acknowledgement of said request

Example Embodiment N6

The radio network node according to example embodiment N4 or N5, wherein the radio network node comprises one or several of the following: an evolved NodeB (eNB), a Home Subscriber Server (HSS), a Mobility Management Entity (MME).

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure. Although specific terms may be employed herein, they are used in a generic and descriptive sense only and not for purposes of limitation.

ABBREVIATIONS

3GPP 3$^{rd}$ Generation Partnership Project
CC Credit Control
DL Downlink
DRX Discontinuous Reception
eNB eNodeB
eNodeB E-UTRAN NodeB
EPS Evolved Packet System
E-UTRA Evolved Universal Terrestrial Radio Access
E-UTRAN Evolved UTRAN
GPRS General Packet Radio Service
GTPv2-C The control plane part of the GPRS Tunneling Protocol version 2.
HLR Home Location Register
HSPA High Speed Packet Access
HSS Home Subscriber Server
IE Information Element
IMSI International Mobile Subscriber Identity
IP Internet Protocol
IP-CAN IP Connectivity Access Network
LTE Long Term Evolution
M2M Machine-to-Machine
MAC Medium Access Control
MD Machine Device
MME Mobility Management Entity
MOD Modulo
MS Mobile Station
Msg Message
MTC Machine Type Communication
NAS Non-Access Stratum
PCEF Policy and Charging Enforcement Function
PCRF Policy and Charging Rules Function
PDN Packet Data Network
PDU Packet Data Unit
PGW PDN Gateway
RA Random Access
RRC Radio Resource Control
S1 The interface between the Radio Access Network and the Core network in EPS.

S1AP S1 Application Protocol (a control plane protocol used between an eNB and an MME)
SGSN Serving GPRS Support Node
SGW Serving Gateway
SI System Information
TS Technical Specification
UE User Equipment
UL Uplink
UMTS Universal Mobile Telecommunications System
USIM Universal Subscriber Identity Module
UTRAN Universal Terrestrial Radio Access Network
WCDMA Wideband Code Division Multiple Access

The invention claimed is:

1. A method performed by a user equipment (UE) wherein the UE is configured to be either in an idle mode or in a connected mode, the method comprising:
applying a discontinuous reception (DRX) cycle during a time period when the UE is in transition from the idle mode to the connected mode, and in which the UE performs a Random Access procedure.

2. The method according to claim 1, wherein the DRX cycle is a temporary DRX cycle.

3. The method according to claim 2, wherein the temporary DRX cycle is applied only when the UE is in transition from the idle mode to the connected mode.

4. The method according to claim 2, comprising:
ceasing to apply the temporary DRX cycle when the UE has transitioned to the connected mode.

5. The method according to claim 1, comprising:
applying one or several DRX configuration parameters during the time period when the UE is in transition from the idle mode to the connected mode.

6. The method according to claim 1, comprising, prior to applying the DRX cycle during the time period when the UE is in transition from the idle mode to the connected mode:
transmitting a data message to a radio network node, the data message comprising a request to apply the DRX cycle during the time period when the UE is in transition from the idle mode to the connected mode.

7. The method according to claim 6, comprising, prior to applying the DRX cycle during the time period when the UE is in transition from the idle mode to the connected mode:
receiving another data message from the radio network node, the another data message comprising an acknowledgement of said request.

8. The method according to claim 1, comprising, prior to applying the DRX cycle during the time period when the UE is in transition from the idle mode to the connected mode:
retrieving the DRX cycle to be applied during the time period when the UE is in transition from the idle mode to the connected mode.

9. The method according to claim 8, wherein retrieving the DRX cycle to be applied during the time period when the UE is in transition from the idle mode to the connected mode comprises:
receiving a data message from a radio network node, the data message comprising information about the DRX cycle.

10. The method according to claim 8, wherein retrieving the DRX cycle to be applied during the time period when the UE is in transition from the idle mode to the connected mode comprises:
retrieving information about the DRX cycle from a memory associated with the UE.

11. The method according to claim 5, comprising, prior to applying the DRX cycle during the time period when the UE is in transition from the idle mode to the connected mode:
retrieving DRX configuration parameters to be applied during the time period when the UE is in transition from the idle mode to the connected mode.

12. The method according to claim 11, wherein retrieving the DRX configuration parameters to be applied during the time period when the UE is in transition from the idle mode to the connected mode comprises:
receiving a data message from a radio network node, the data message comprising the DRX configuration parameters.

13. The method according to claim 11, wherein retrieving the DRX configuration parameters to be applied during the time period when the UE is in transition from the idle mode to the connected mode comprises:
retrieving the DRX configuration parameters from a memory associated with the UE.

14. A method performed by a radio network node, the method comprising:
transmitting a data message to a user equipment (UE) the data message comprising information about a DRX cycle to be applied by the UE during the time period when the UE is in transition from the idle mode to the connected mode, and in which the UE performs a Random Access procedure.

15. The method according to claim 14, comprising:
transmitting another data message to the UE, the another data message comprising DRX configuration parameters to be applied by the UE during the time period when the UE is in transition from the idle mode to the connected mode.

16. The method according to claim 14, comprising:
receiving another data message from the UE, the another data message comprising a request to apply a DRX cycle during the time period when the UE is in transition from the idle mode to the connected mode.

17. The method according to claim 16, comprising:
transmitting an acknowledgment of said request to the UE.

18. A user equipment (UE) configured to be either in an idle mode or in a connected mode, the UE comprising:
a processor; and
a memory storing computer program code, which, when run in the processor causes the UE to apply a discontinuous reception (DRX) cycle during a time period when the UE is in transition from the idle mode to the connected mode, and in which the UE performs a Random Access procedure.

19. The UE according to claim 18, wherein the DRX cycle is a temporary DRX cycle.

20. The UE according to claim 19, wherein the memory stores computer program code, which, when run in the processor causes the UE to apply the temporary DRX cycle only when the UE is in transition from the idle mode to the connected mode.

21. The UE according to claim 19, wherein the memory stores computer program code, which, when run in the processor causes the UE to cease to apply the temporary DRX cycle when the UE has transitioned to the connected mode.

22. The UE according to claim 18, wherein the memory stores computer program code, which, when run in the processor causes the UE to apply one or several DRX configuration parameters during the time period when the UE is in transition from the idle mode to the connected mode.

23. The UE according to claim 18, comprising a transmitter configured to transmit a data message to a radio network node, the data message comprising a request to apply the DRX cycle during the time period when the UE is in transition from the idle mode to the connected mode.

24. The UE according to claim 23, comprising a receiver configured to receive another data message from the radio network node, the another data message comprising an acknowledgement of said request.

25. The UE according to claim 18, wherein the memory stores computer program code, which, when run in the processor causes the UE to retrieve the DRX cycle to be applied during the time period when the UE is in transition from the idle mode to the connected mode.

26. The UE according to claim 25, comprising a receiver configured to receive a data message from a radio network node, the data message comprising information about the DRX cycle.

27. The UE according to claim 25, wherein the memory stores computer program code, which, when run in the processor causes the UE to retrieve information about the DRX cycle from a memory associated with the UE.

28. The UE according to claim 22, wherein the memory stores computer program code, which, when run in the processor causes the UE to retrieve the DRX configuration parameters to be applied during the time period when the UE is in transition from the idle mode to the connected mode.

29. The UE according to claim 28, wherein the receiver is configured to receive a data message from a radio network node, the data message comprising the DRX configuration parameters.

30. The UE according to claim 28, wherein the memory stores computer program code, which, when run in the processor causes the UE to retrieve the DRX configuration parameters from a memory associated with the UE.

31. A radio network node, comprising:
a transmitter configured to transmit a data message to a user equipment (UE) the data message comprising information about a DRX cycle to be applied by the UE during the time period when the UE is in transition from the idle mode to the connected mode, and in which the UE performs a Random Access procedure.

32. The radio network node according to claim 31, wherein the transmitter is configured to transmit another data message to the UE, the data message comprising DRX configuration parameters to be applied by the UE during the time period when the UE is in transition from the idle mode to the connected mode.

33. The radio network node according to claim 31, comprising:
a receiver configured to receive another data message from the UE the another data message comprising a request to apply a DRX cycle during the time period when the UE is in transition from the idle mode to the connected mode.

34. The radio network node according to claim 33, comprising a transmitter configured to transmit an acknowledgement of said request to the UE.

35. The radio network node according to claim 31, wherein the radio network node comprises one or several of the following: an evolved NodeB (eNB), a Home Subscriber Server (HSS), a Mobility Management Entity (MME).

* * * * *

UNITED STATES PATENT AND TRADEMARK OFFICE
CERTIFICATE OF CORRECTION

PATENT NO. : 9,877,352 B2
APPLICATION NO. : 14/784365
DATED : January 23, 2018
INVENTOR(S) : Rune et al.

Page 1 of 2

It is certified that error appears in the above-identified patent and that said Letters Patent is hereby corrected as shown below:

In the Drawings

In Fig. 1B, Sheet 3 of 8, for Step "10", Line 1, delete "Authetication" and insert -- Authentication --, therefor.

In Fig. 1B, Sheet 3 of 8, for Step "11", Line 1, delete "Authetication" and insert -- Authentication --, therefor.

In Fig. 1B, Sheet 3 of 8, for Step "12", Line 1, delete "Authetication" and insert -- Authentication --, therefor.

In the Specification

In Column 10, Line 16, delete "11)")" and insert -- 11)"). --, therefor.

In Column 13, Line 3, delete "mode" and insert -- mode. --, therefor.

In Column 14, Line 22, delete "V.11.4.0)" and insert -- V.11.4.0); --, therefor.

In Column 14, Line 23, delete "FIG. 1B)" and insert -- FIG. 1B); --, therefor.

In Column 14, Line 24, delete "capability;" and insert -- capability. --, therefor.

In Column 14, Line 43, delete "FIG. 1)" and insert -- FIG. 1); --, therefor.

In Column 15, Line 43, delete "RRCConnectionSetupRRC" and insert -- RRCConnectionSetup RRC --, therefor.

In Column 20, Line 50, delete "memory denoted 11." and insert -- memory denoted 13. --, therefor.

Signed and Sealed this
Twelfth Day of June, 2018

Andrei Iancu
*Director of the United States Patent and Trademark Office*

CERTIFICATE OF CORRECTION (continued)
U.S. Pat. No. 9,877,352 B2

In Column 20, Line 66, delete "memory denoted 11." and insert -- memory denoted 13. --, therefor.

In Column 28, Line 10, delete "request" and insert -- request. --, therefor.

In the Claims

In Column 32, Line 19, in Claim 33, delete "UE the" and insert -- UE, the --, therefor.